(12) United States Patent
Wang

(10) Patent No.: US 7,876,585 B2
(45) Date of Patent: Jan. 25, 2011

(54) VOLTAGE PROVIDING CIRCUIT AND RELATED METHOD THEREOF

(75) Inventor: Chien-Chuan Wang, Hsinchu County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 373 days.

(21) Appl. No.: 12/030,205

(22) Filed: Feb. 13, 2008

(65) Prior Publication Data

US 2008/0265861 A1 Oct. 30, 2008

(30) Foreign Application Priority Data

Apr. 27, 2007 (TW) .............................. 96114886 A

(51) Int. Cl.
*H02M 3/18* (2006.01)
(52) U.S. Cl. ....................................................... 363/59
(58) Field of Classification Search .................. 363/59, 363/60; 327/535, 536; 331/17, 23, 25, 34
See application file for complete search history.

(56) References Cited

U.S. PATENT DOCUMENTS

| | | | | |
|---|---|---|---|---|
| 5,774,023 A | * | 6/1998 | Irwin | ........................... 331/17 |
| 5,781,048 A | * | 7/1998 | Nakao et al. | ................. 327/157 |
| 6,563,387 B2 | * | 5/2003 | Hirano et al. | .................. 331/11 |
| 6,788,133 B2 | | 9/2004 | Liu | |
| 6,816,001 B2 | | 11/2004 | Khouri et al. | |
| 6,829,318 B2 | * | 12/2004 | Kawahara | .................... 375/376 |
| 7,162,002 B2 | * | 1/2007 | Chen et al. | .................... 375/376 |
| 2004/0136213 A1 | | 7/2004 | Fujise | |
| 2006/0290411 A1 | | 12/2006 | Smith | |
| 2010/0164634 A1 | * | 7/2010 | Jeon | ............................. 331/17 |
| 2010/0183109 A1 | * | 7/2010 | Lin et al. | ..................... 375/376 |

FOREIGN PATENT DOCUMENTS

| | | |
|---|---|---|
| CN | 1485971 A | 3/2004 |
| CN | 1503440 A | 6/2004 |
| TW | I222081 | 10/2004 |
| TW | I259426 | 8/2006 |
| TW | I277853 | 4/2007 |

* cited by examiner

*Primary Examiner*—Matthew V Nguyen
(74) *Attorney, Agent, or Firm*—Winston Hsu; Scott Margo

(57) ABSTRACT

A voltage providing circuit for generating an output voltage, which includes: a plurality of oscillating circuits, for providing clock signals with different frequencies; a detection circuit, for generating a detection result according to a reference voltage and the output voltage; a selecting unit, coupled to the oscillating circuits and the detection circuit, for selecting one of the clock signals according to the detection result; and a charge pump circuit, for controlling a charge pump according to the clock signal selected by the selecting unit to generate the output voltage.

4 Claims, 4 Drawing Sheets

VOLTAGE PROVIDING CIRCUIT AND RELATED METHOD THEREOF

BACKGROUND OF THE INVENTION

1. Field of the Invention

The present invention relates to a voltage providing circuit and a related method, and particularly relates to a voltage providing circuit for an LCD driving circuit and related method.

2. Description of the Prior Art

In an LCD driving circuit, a charge pump is always used for providing different desired voltages. For example, a source in a LCD matrix needs a voltage of 0~6 V to provide different color depths, but a gate needs a voltage of 6~12V. Furthermore, different states of LCDs need different amounts of current. For example, a larger current is needed when an image is transformed from black to white, but other states of the LCD require smaller currents. A redundant current, however, will not flow back to the charge pump after the charge pump voltage is increased, thus the redundant current is consumed and the power consumption increases. The more frequently the charge pump increases the voltage, the larger the power consumption.

Therefore, in order to decrease power consumption, a high frequency clock signal should not be provided to the charge pump unless necessary.

SUMMARY OF THE INVENTION

One objective of the present invention is to provide a voltage providing circuit for generating an output voltage. The voltage providing circuit comprises a charge pump, which utilizes a higher frequency when a back end circuit needs high power and utilizes a lower frequency when the back end circuit does not need high power or the output voltage of the charge pump is not lower than a reference voltage, such that the power consumption can be decreased.

One embodiment of the present invention discloses a voltage providing circuit for generating an output voltage. The voltage providing circuit comprises: a plurality of oscillating circuits, for providing a plurality of clock signals with different frequencies; a detection circuit, for generating a detection result according to a reference voltage and the output voltage; a selecting unit, coupled to the oscillating circuits and the detection circuit, for selecting and outputting one of the clock signals according to the detection result; and a charge pump circuit, for controlling a charge pump according to the clock signal selected by the selecting unit to generate the output voltage.

Another embodiment of the present invention discloses a voltage providing method for controlling a charge pump to generate an output voltage. The voltage providing method corresponds to the above-mentioned voltage providing circuit and comprises: providing a first clock signal and a second clock signal, wherein the frequency of the first clock signal is higher than that of the second clock signal; comparing a reference voltage and the output voltage to generate a comparing result; selecting one of the first clock signal and the second clock signal as a control signal of the charge pump according to the comparing result; wherein the first clock signal is selected as the control signal of the charge pump when the reference voltage is larger than the output voltage; and the second clock signal is selected as the control signal of the charge pump when the reference voltage is smaller than the output voltage Another embodiment of the present invention discloses a voltage providing circuit for generating an output voltage. The voltage providing circuit comprises: an oscillating circuit, for providing a clock signal; a detection circuit, for generating a detection result according to a reference voltage and the output voltage; a controllable frequency divider, coupled to the oscillating circuit and the detection circuit, wherein the controllable frequency divider comprises a plurality of frequency dividing ratios and selects one of the frequency dividing ratios according to the detection result, and utilizes the selected frequency dividing ratio to frequency-divide the clock signal to generate a frequency-divided clock signal; and a charge pump circuit, for controlling a charge pump according to the frequency-divided clock signal to generate the output voltage.

Another embodiment of the present invention discloses a voltage providing method for controlling a charge pump to generate an output voltage. The voltage providing method corresponds to the above-mentioned voltage providing circuit and comprises: providing a clock signal; providing a first frequency dividing ratio and a second frequency dividing ratio, wherein the first frequency dividing ratio is smaller than the second frequency dividing ratio; comparing a reference voltage and the output voltage to generate a comparing result; and selecting one of the first frequency dividing ratio and the second frequency dividing ratio to frequency-divide the clock signal according to the detection result, and utilizing the frequency-divided clock signal as the control signal of the charge pump; wherein the first frequency dividing ratio is used to frequency-divide the clock signal when the reference voltage is larger than the output voltage, and the second frequency dividing ratio is used to frequency-divide the clock signal when the reference voltage is smaller than the output voltage.

According to the above-mentioned circuit and method, the charge pump only operates at a high frequency when necessary, therefore the power consumption due to the charge pump switch can be decreased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
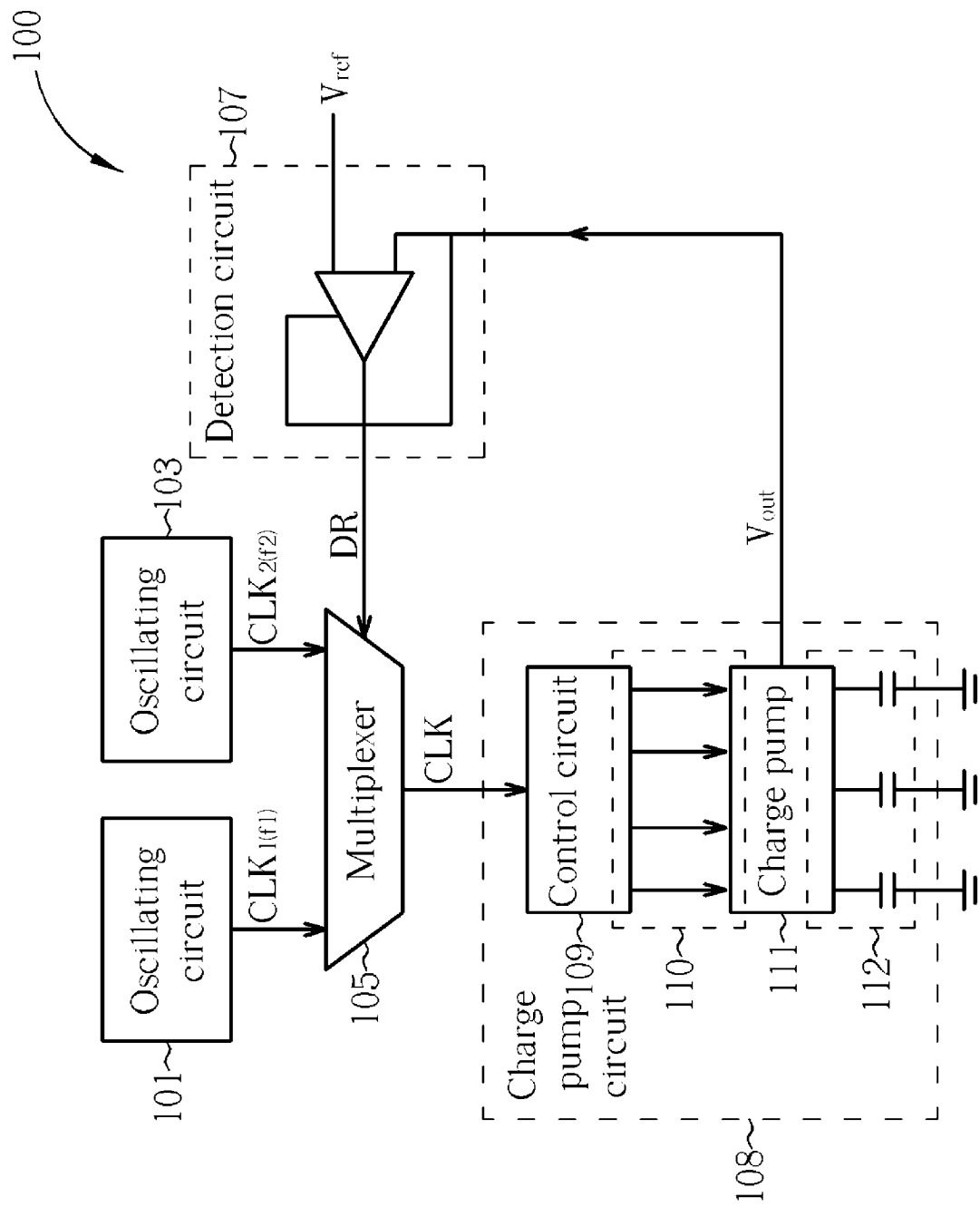
FIG. 1 illustrates a voltage providing circuit according to a first embodiment of the present invention.

FIG. 1 illustrates a voltage providing circuit 100 according to a first embodiment of the present invention. As shown in FIG. 1, the voltage providing circuit 100 comprises oscillating circuits 101, 103, a multiplexer 105, a detection circuit 107 and a charge pump circuit 108. The oscillating circuits 101 and 103 are used for providing clock signals $CLK_1$ and $CLK_2$ with different frequencies $f_1$ and $f_2$, respectively. The frequency $f_1$ is larger than the frequency $f_2$.

The detection circuit 107 is used for comparing a reference voltage Vref and the output voltage Vout from the charge pump circuit 108 to generate a detection result DR. The multiplexer 105 (selecting unit), which is coupled to the oscillating circuits 101 and 103, is used for selecting one of the clock signals $CLK_1$ and $CLK_2$ as the clock signal CLK to be outputted according to the detection result DR from the detection circuit 107. The charge pump circuit 108 is used for controlling a charge pump according to the clock signal CLK to generate the output voltage $V_{out}$. In this embodiment, the charge pump circuit 108 comprises a control circuit 109, a connection part 110, a charge pump 111 and a capacitor part 112. A 4 phase charge pump is taken as an example for the charge pump 111, which consists of 4 MOSs (Metal-Oxide-Semiconductors). The control circuit 109 controls turning on and off the MOSs of the charge pump 111 via the connection lines of the connection part 110 according to the clock signal CLK, and then the charge pump 111 matches up the capacitors of the capacitor part 112 to generate different output voltages $V_{out}$. The frequency of the clock signal CLK thereby determines the turning on and off frequency of the MOSs in the charge pump 111, and the turning on and off frequency of the MOSs in the charge pump 111 determines the rising speed of the output voltage $V_{out}$. It should be noted that the above-mentioned description is not meant to limit the scope of the present invention. The control mechanism according to the present invention can also be applied to other types of charge pumps, and the arrangement of the connection part 110 and the capacitor part 112 may be different according to the types of charge pumps.

The multiplexer 105 outputs the clock signal $CLK_1$ with higher frequency $f_1$ when the back-end device needs large power or the output voltage $V_{out}$ is lower than the reference voltage $V_{ref}$, so the charge pump can quickly output a desired voltage. According to $i\Delta t = c\Delta V$, the clock signal $CLK_1$ with higher frequency $f_1$ can support a larger current demand of the back-end device. The multiplexer 105 outputs the clock signal $CLK_2$ with lower frequency $f_2$ when the back-end device does not need large power or the output voltage $V_{out}$ is not lower than the reference voltage $V_{ref}$, thereby power consumption due to the on/off operation of the charge pump 111 can decrease. It should be noted that, although two oscillating circuits are utilized for explaining the embodiment according to the present invention, this is not a limitation of the scope of the present invention. The implementation of the present invention can utilize more than two oscillating circuits to generate more than two clock signals. The detection circuit detects the difference between the reference voltage and the output voltage to output a detection result, and the multiplexer selects and outputs one of the clock signals according to the detection result.

The reference voltage $V_{ref}$ can be a predetermined value when the voltage providing circuit 100 is utilized for an LCD driving circuit, and the reference voltage $V_{ref}$ can be adaptively adjusted. In this embodiment, the detection circuit is a comparator with receiving terminals coupled to the reference voltage $V_{ref}$ and the output voltage $V_{out}$, and the comparator compares the reference voltage $V_{ref}$ and the output voltage $V_{out}$ to generate the detection result DR. The multiplexer 105 can be other selecting units having the same function.

Figure 2:
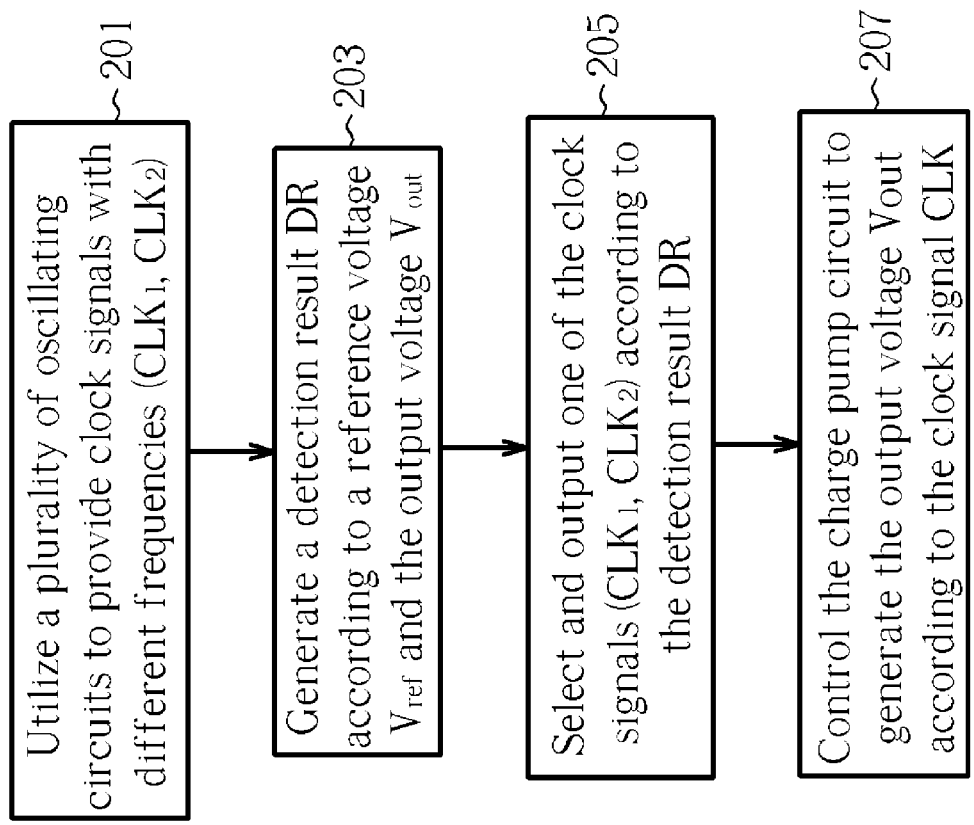
FIG. 2 illustrates a voltage providing method corresponding to the voltage providing circuit shown in FIG. 1.

A voltage providing method shown in FIG. 2 can be obtained according to the voltage providing circuit 100 shown in FIG. 1. In the following description, the above-mentioned circuit can be utilized to perform the method herein so the operation of the above-mentioned circuit can be understood more clearly. However, this does not mean that the following method can only be performed by the above-mentioned circuit. Utilizing other circuits to perform the following method or any equivalent method also falls within the scope of the present invention.

The method includes the following steps:

Step 201: Utilize oscillating circuits 101, 103 to provide clock signals $CLK_1$, $CLK_2$ with different frequencies $f_1$, $f_2$, respectively. The frequency $f_1$ is larger than frequency $f_2$.

Step 203: Utilize the detection circuit 107 to generate a detection result DR according to a reference voltage $V_{ref}$ and the output voltage $V_{out}$.

Step 205: Utilize a selecting unit (multiplexer 105) to select and output one of the clock signals ($CLK_1$, $CLK_2$) according to the detection result DR. One implementation of this step is: the selecting unit outputs the clock signal $CLK_1$ with higher frequency $f_1$ when the back-end device needs large power or the output voltage $V_{out}$ is lower than the reference voltage $V_{ref}$. The selecting unit outputs the clock signal $CLK_2$ with lower frequency $f_2$ when the back-end device does not need large power or the output voltage $V_{out}$ is not lower than the reference voltage $V_{ref}$.

Step 207: Let the charge pump circuit generate the output voltage Vout.

Other detailed characteristics are already disclosed in the description of the above-mentioned circuit, and are therefore omitted here for brevity.

Figure 3:
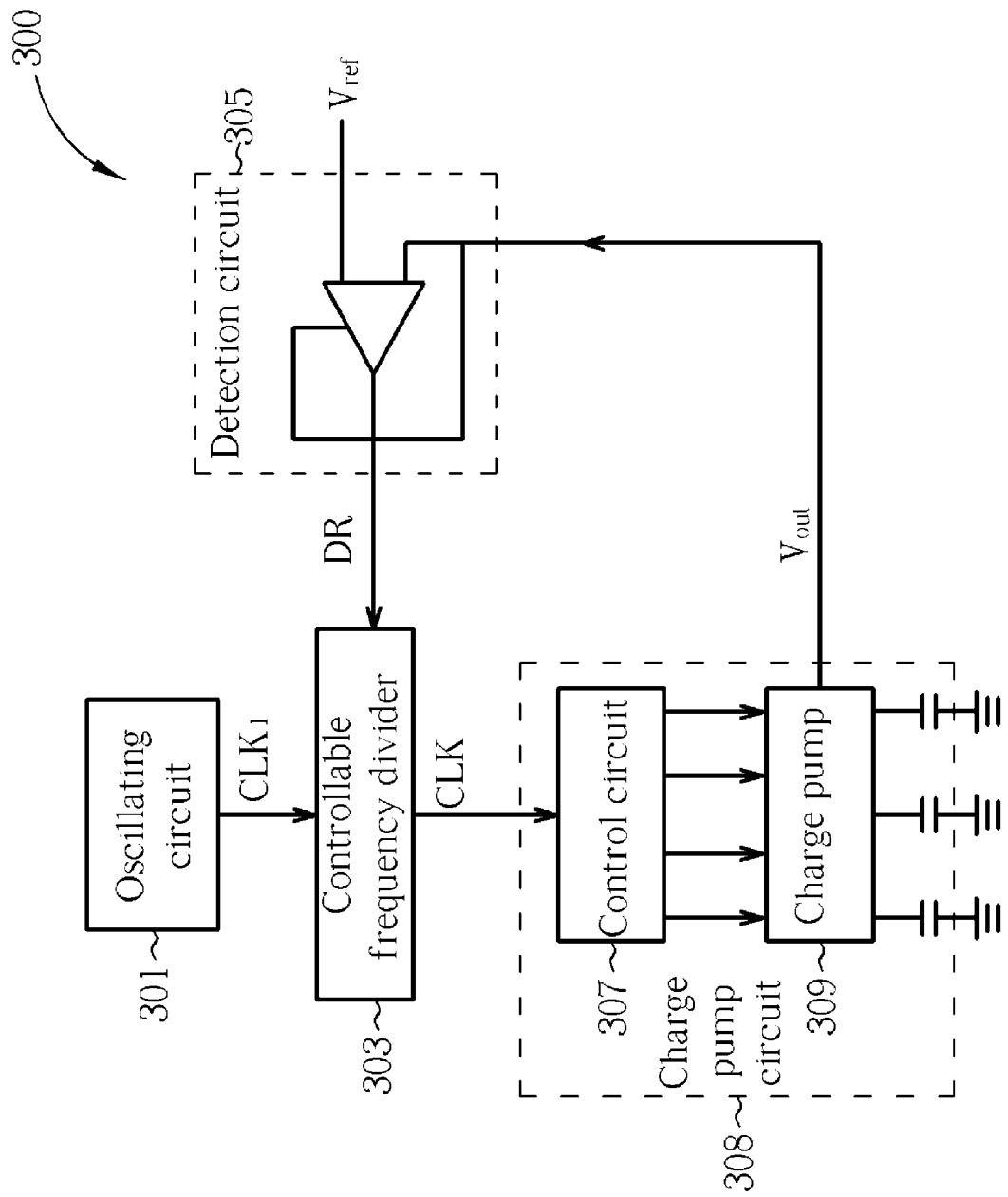
FIG. 3 illustrates a voltage providing circuit according to a second embodiment of the present invention.

FIG. 3 illustrates a voltage providing circuit 300 according to a second embodiment of the present invention. The difference between the voltage providing circuit 100 and 300 is that the voltage providing circuit 100 utilizes oscillating circuits 101 and 103, the multiplexer 105 and the detection circuit 107 to generate the desired clock signal CLK to the charge pump circuit 108, but the voltage providing circuit 300 utilizes the oscillating circuit 301, the controllable frequency divider 303 and the detection circuit 305 to generate the desired clock signal CLK to the charge pump circuit 308. The oscillating circuit 301 is used for providing a clock signal $CLK_1$. The controllable frequency divider 303, which is coupled to the oscillating circuit 301, comprises a plurality of frequency dividing ratios and selects one of the frequency dividing ratios to frequency-divide the clock signal $CLK_1$ to controllably generate a clock signal CLK. The detection circuit 305 is used for generating a detection result DR according to a reference voltage $V_{ref}$ and the output voltage $V_{out}$ from the charge pump circuit 308, and the controllable frequency divider 303 determines the frequency-dividing ratio for frequency-dividing the clock signal $CLK_1$ according to the detection result DR. Similar to the concept of the voltage providing circuit 100, the frequency dividing ratios of the controllable frequency divider 303 include a high frequency dividing ratio and a low frequency dividing ratio. The controllable frequency divider 303 utilizes the low frequency dividing ratio to frequency-divide the clock signal $CLK_1$ to form the clock signal CLK with higher frequency when the output voltage $V_{out}$ is smaller than the output voltage $V_{ref}$ or the back-end device needs large power. The controllable frequency divider 303 utilizes the high frequency dividing ratio to frequency-divide the clock signal $CLK_1$ to form the clock signal CLK with lower frequency when the output voltage $V_{out}$ is not smaller than the output voltage $V_{ref}$ or the back-end device does not need large power. Then the charge pump circuit 308 generates the output voltage $V_{out}$ according to the clock signal CLK.

Other operational details or characteristics of the voltage providing circuit 300 are the same as that of the voltage providing circuit 100, and are thus omitted here for brevity.

Figure 4:
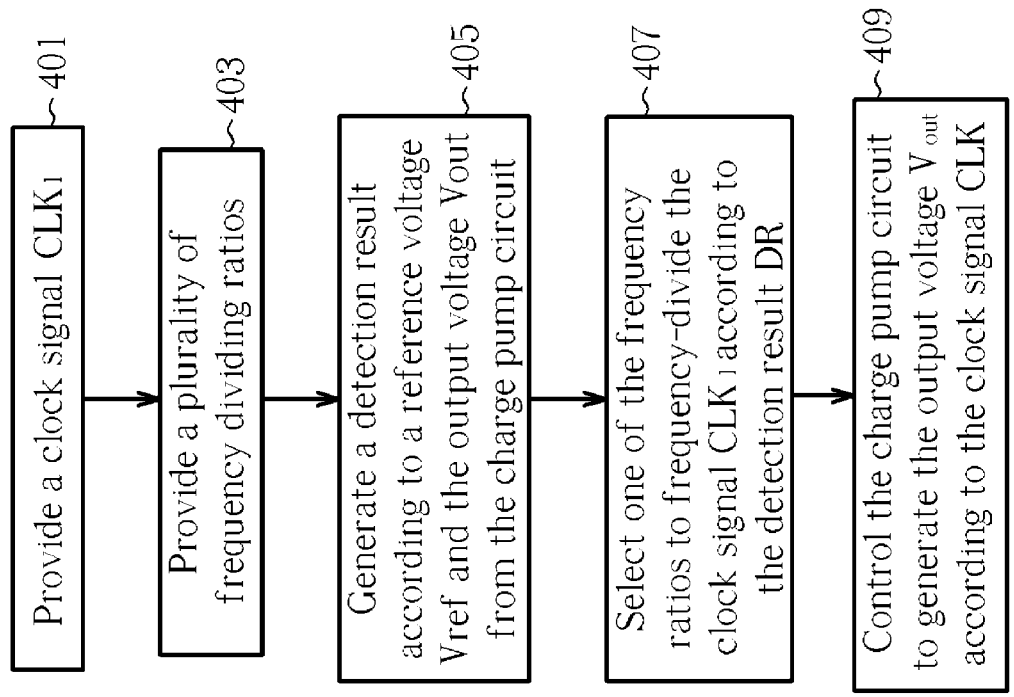
FIG. 4 illustrates a voltage providing method corresponding to the voltage providing circuit shown in FIG. 3.

A voltage providing method shown in FIG. 4 can be obtained according to the voltage providing circuit 300 shown in FIG. 3. Similarly, the above-mentioned voltage providing circuit 300 can be utilized to perform the method described herein so the operation of the voltage providing circuit 300 can be understood more clearly. However, this does not mean that the following method can only be performed by the voltage providing circuit 300. Utilizing other circuits to perform the following method or any equivalent also falls within the scope of the present invention.

The method includes the following steps:

Step 401: Utilize the oscillating circuit 301 to provide a clock signal $CLK_1$.

Step 403: Utilize the controllable frequency divider 303 to provide a plurality of frequency dividing ratios.

Step 405: Utilize the detection circuit 305 to generate a detection result according to a reference voltage $V_{ref}$ and the output voltage $V_{out}$ from the charge pump circuit 308.

Step 407: Utilize the controllable frequency divider 303 to select one of the frequency dividing ratios to frequency-divide the clock signal $CLK_1$ according to the detection result DR. The controllable frequency divider 303 utilizes the low frequency dividing ratio to frequency-divide the clock signal $CLK_1$ to form the clock signal CLK with higher frequency when the output voltage $V_{out}$ is smaller than the output voltage $V_{ref}$ or the back-end device needs large power. The controllable frequency divider 303 utilizes the high frequency dividing ratio to frequency-divide the clock signal $CLK_1$ to form the clock signal CLK with lower frequency when the output voltage $V_{out}$ is not smaller than the output voltage $V_{ref}$ or the back-end device doest not need large power.

Step 409: Control the charge pump circuit 308 to generate the output voltage $V_{out}$ according to the clock signal CLK Other detailed characteristics are already disclosed in the description of the voltage providing circuit 300, and are therefore omitted here for brevity.

According to the above-mentioned circuit and method, the charge pump only operates at a high frequency when necessary, therefore the power consumption due to the switching of the charge pump can be decreased.

Those skilled in the art will readily observe that numerous modifications and alterations of the device and method may be made while retaining the teachings of the invention.

What is claimed is:

1. A voltage providing circuit, for generating an output voltage, comprising:
   an oscillating circuit, for providing a clock signal;
   a detection circuit, for generating a detection result according to a reference voltage and the output voltage;
   a controllable frequency divider, coupled to the oscillating circuit and the detection circuit, wherein the controllable frequency divider comprises a plurality of frequency dividing ratios and selects one of the frequency dividing ratios according to the detection result, and utilizes the selected frequency dividing ratio to frequency-divide the clock signal to generate a frequency-divided clock signal; and
   a charge pump circuit, for controlling a charge pump according to the frequency-divided clock signal to generate the output voltage
   wherein the plurality of frequency dividing ratios of the controllable frequency divider comprises a high frequency dividing ratio and a low frequency dividing ratio; the controllable frequency divider utilizes the low frequency dividing ratio to frequency-divide the clock signal when the reference voltage is larger than the output voltage, and the controllable frequency divider utilizes the high frequency dividing ratio to frequency-divide the clock signal when the reference voltage is smaller than the output voltage.

2. The voltage providing circuit of claim 1, wherein the detection circuit is a comparator.

3. The voltage providing circuit of claim 1, wherein the charge pump circuit comprises a control circuit for controlling the charge pump according to the frequency-divided clock signal.

4. A voltage providing method, for controlling a charge pump to generate an output voltage, comprising:
   providing a clock signal;
   providing a first frequency dividing ratio and a second frequency dividing ratio, wherein the first frequency dividing ratio is smaller than the second frequency dividing ratio;
   comparing a reference voltage and the output voltage to generate a comparing result; and
   selecting one of the first frequency dividing ratio and the second frequency dividing ratio to frequency-divide the clock signal according to the detection result, and utilizing the frequency-divided clock signal as the control signal of the charge pump;
   wherein the first frequency dividing ratio is used to frequency-divide the clock signal when the reference voltage is larger than the output voltage, and the second frequency dividing ratio is used to frequency-divide the clock signal when the reference voltage is smaller than the output voltage.

* * * * *